Figure 1:
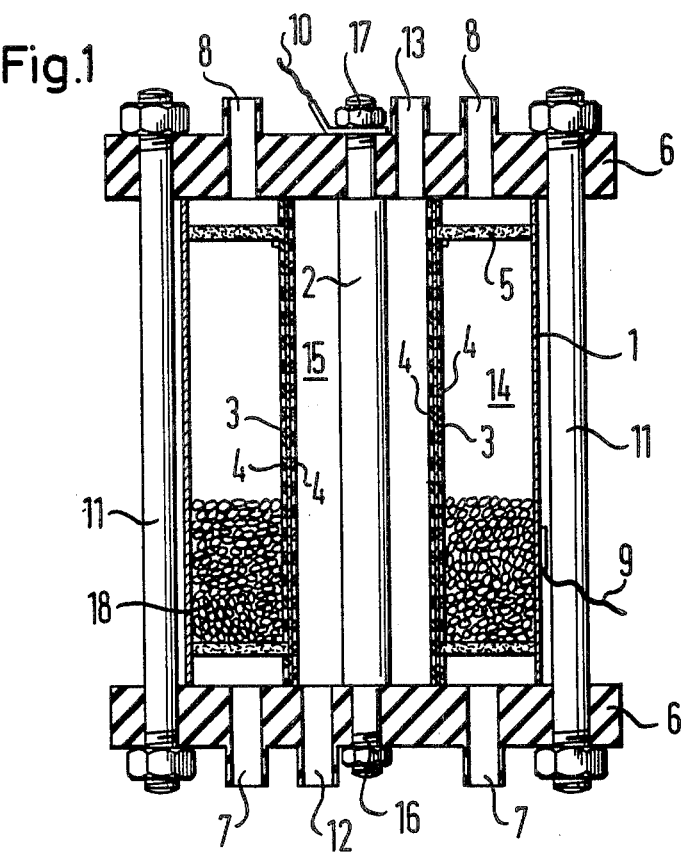

United States Patent [19]

Reis et al.

[11] 4,013,554

[45] Mar. 22, 1977

[54] METHOD AND APPARATUS FOR PURIFYING WATER CONTAMINATED WITH ANODICALLY OXIDIZABLE ORGANIC MATTER

[75] Inventors: August Reis; Karl-Ernst Quentin; Ludwig Weil, all of Munich, Germany

[73] Assignee: Sachs-Systemtechnik GmbH, Schweinfurt am Main, Germany

[22] Filed: May 13, 1975

[21] Appl. No.: 577,044

[30] Foreign Application Priority Data

May 17, 1974 Germany .................. 2424091

[52] U.S. Cl. .................. 210/40; 210/243; 210/502; 204/149; 204/180 B
[51] Int. Cl.² .................. B01D 15/06
[58] Field of Search .................. 210/22, 23, 40, 75, 210/193, 506, 243; 204/149–151, 180 B, 180 P, 181

[56] References Cited

UNITED STATES PATENTS

| | | | |
|---|---|---|---|
| 673,452 | 5/1901 | Roberts | 204/151 |
| 3,716,459 | 2/1973 | Salter et al. | 204/151 X |
| 3,730,885 | 5/1973 | Makrides et al. | 210/40 X |

*Primary Examiner*—Frank A. Spear, Jr.
*Assistant Examiner*—Ferris H. Lander
*Attorney, Agent, or Firm*—Hans Berman; Kurt Kelman

[57] ABSTRACT

Contaminated water is pumped through the anode compartment of an electrolytic cell which is separated from the cathode compartment by a diaphragm permeable to water and to inorganic ions. Particles of hydrophilic, electrically conductive, carbonaceous material capable of adsorbing the contaminants are retained in the anode compartment by the diaphragm and by screens in the water discharge conduit and are held in turbulent suspension by the flowing water so that they make intermittent conductive contact with the anode surface.

6 Claims, 2 Drawing Figures

METHOD AND APPARATUS FOR PURIFYING WATER CONTAMINATED WITH ANODICALLY OXIDIZABLE ORGANIC MATTER

This invention relates to the purification of water contaminated with organic matter, and particularly to a method of purifying such water when contaminated with anodically oxidizable organic matter and to apparatus for performing the method.

Numerous proposals have been made for purification of water containing anodically oxidizable organic contaminants. The known methods cause the contaminated water to flow over a conductive surface which is made anodic relative to the aqueous liquid. It is assumed that the organic material is oxidized by atomic oxygen which is generated at the anode surface by electrolysis of the water and quickly converted to ineffective molecular oxygen. Because of the extremely short time during which the effective oxidant is available, the efficiency of the known electrolytic water purification systems is low. Diffusion must be relied upon to bring the contaminants within range of the oxidant and is necessarily slow.

The primary object of this invention is the provision of a method which more effectively employs an electrolyzing current for decomposition of organic contaminants than was possible heretofore.

A concomitant object is the provision of apparatus suitable for performing the method.

It has been found that the current efficiency, more specifically the anode efficiency of a system for electrolytically purifying contaminated drinking water and the like can be enhanced greatly by substantially completely divorcing the steps of moving the contaminants to a conductive surface by diffusion or the like, and of oxidizing the contaminants at the surface or in its immediate vicinity by means of the nascent or atomic oxygen.

According to the method of the invention, the contaminated water is mixed with particulate, electrically conductive material capable of adsorbing the organic impurities. The mixture so produced is contacted with the electrolytically conductive surface of a body while a potential applied to that surface makes the surface anodic relative to the contaminated water. Contact between the particles in the mixture and the anodic surface need be maintained only for the very short time required to cause oxidation of the adsorbed impurities by the nascent oxygen generated on the particle surfaces while ample time is also available for adsorption of the impurities on the particle surfaces while the particles are remote from the anodic surface.

The mixture of particles and contaminated water may be agitated at a rate sufficient to produce turbulent movement of the particles in the mixture and the desired intermittent contact of the impurity-laden particles with the anodic surface. Such turbulent movement or other agitation is brought about conveniently by confining the mixture together with the anode in the anode compartment of an electrolytic cell and by moving the contaminated water through the anode compartment in a continuous flow rapid enough to keep the adsorbent particles suspended and to prevent their agglomeration. If the particles consist of hydrophilic carbonaceous material and have dimensions between 1 and 2 mm, the rate of water movement in the anode compartment should be approximately 50 to 55 meters per hour. Since the adsorptive capacity of the particles decreases only very slowly during repeated cycles of adsorption and oxidation, the particles are preferably retained in the anode compartment by a screen or the like in the water outlet. A membrane permeable to water and inorganic ions should separate the anode and cathode compartments of the cell to avoid diffusion of hydrogen to the anode surface.

The preferred apparatus for performing the aforedescribed method includes a cell divided into anode and cathode compartments by a membrane permeable to water and inorganic ions. Particulate electrically conductive material capable of adsorbing the organic matter from the water is enclosed in the anode compartment. Electrodes in the two compartments may be connected conductively to respective poles of a source of direct current so as to make the electrode in the anode compartment anodic relative to water in the compartment. Water is fed by a suitable conveying arrangement to the anode compartment, and purified water is withdrawn from the compartment. Screens or the like prevent the particulate material from being withdrawn from the anode compartment with the purified water.

Figure 2:
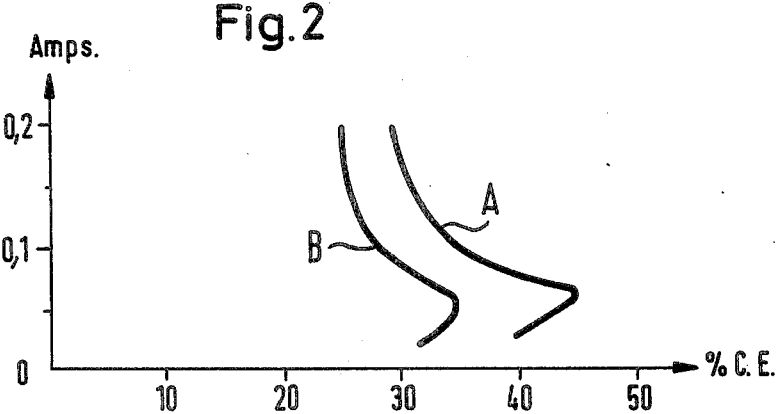

Other features, additional objects, and many of the attendant advantages of this invention will readily be appreciated as the same becomes better understood by reference to the following detailed description of a preferred embodiment when considered in connection with the appended drawing in which:

FIG. 1 shows an electrolytic cell according to the invention in side-elevational section; and FIG. 2 diagrammatically illustrates the effect of current density on current efficiency in the apparatus of FIG. 1 with particulate adsorbent of two grain sizes.

Referring to FIG. 1, there is seen an electrolytic cell whose cylindrical outer wall of Type V4A (Cr/Ni/Mo)-stainless steel, simultaneously serves as the anode. The cathode 2 is a carbon rod extending along the axis of the cylindrical anode. A thin, tubular membrane 3 of celluloseacetate supported between two perforated tubes 4 of polymethylmethacrylate spacedly and coaxially envelops the cathode 2 and radially separates an anode compartment 14 from a cathode compartment 15. Annular discs 5 of fritted glass close the axial ends of the anode compartment 14.

circular discs 6 of insulating material seal the cell in both axial directions and are connected by tie rods 11 so as to clamp the anode 1 therebetween. The carbon rod 2 passes through bores in the discs 6 and is fastened to the discs by cemented, threaded studs 16 and nuts 17 on the studs 16. A row of nipples 7 distributed on the lower disc 6 along a circle about the cell axis are connected to a pump in a manner conventional in itself and not illustrated, and a corresponding row of nipples 8 in the upper disc 6 permits withdrawal of the purified water from the anode compartment 14. Single nipples 12, 13 on the discs 6 adjacent the cathode 2 permit liquid to be fed to the cathode compartment 15 and released as may be desired. A lead 9 is welded to the outer face of the anode 1, and another lead 10 is clamped between one of the nuts 17 and the outer face of the corresponding disc 6. The leads 9 and 10 are normally connected to the terminal of a rectifier for supplying direct current to the cell.

Particles 18 of hydrophilic carbonaceous material rest on the lower annular disc 5 in the illustrated inoperative condition of the cell. They consist mainly of carbon and were prepared by comminuting anthracite and heating the pieces in a vacuum until no further volatile material was released.

The resulting product was hydrophilic, insoluble in water, and did not contain any components which would migrate into water when the product was immersed in water at ordinary temperature of up to about 30° C. It oxidized very slowly when made anodic in tap water, and was sufficiently hard and abrasion resistant for the intended purpose. The fraction having maximum dimensions between 1 and 2 mm was separated from coarser and finer grains by screening and confined in the anode compartment 14 before assembly of the cell was completed.

During operation of the illustrated cell, water contaminated with organic matter was pumped to the nipples 7 at a rate to maintain a flow velocity of 50 to 55 meters per hour in the anode compartment. Water was also supplied to the cathode compartment 15 at a rate sufficient to sweep hydrogen bubbles from the cathode surface. Tests with a cell in which the opaque stainless steel wall was replaced by glass indicated that the selected flow rate in the anode compartment was sufficient to keep the carbonaceous particles suspended and to avoid agglomeration. The movement of the particles 18 was turbulent so that the particles made frequent, but intermittent contact with the outer wall. They did not normally reach the upper fritted glass disc 5, and were prevented from leaving the anode compartment 14 with the water stream if they did.

For quantitative operating tests of the cell, aqueous solutions of oxalic acid were found to give reproducible and significant results. Oxalic acid is not measurably attacked by molecular oxygen at 25° C in aqueous solution, but reacts readily with atomic oxygen to form $CO_2$ and water. One liter of a solution of 45 mg oxalic acid ($5 \times 10^{-4}$ mole/liter) in a synthetic tap water free from calcium ions and having a pH of 7.9 and a conductivity of 480 mhos was circulated through the cell while 2.8 ampere-minutes of current was passed between the electrodes 1, 2. This amount of current was sufficient to oxidize the entire oxalic acid if atomic oxygen was generated at the anode with 100% efficiency, and if the atomic oxygen decomposed its theoretical equivalent of oxalic acid.

The anode compartment of the cell had an outer diameter of 6 cm, an inner diameter of 2.6 cm, and an axial length of 8 cm between the discs 6.

The relationship between the strength of the current and the resulting actual destruction of oxalic acid in the circulated liquid is shown graphically in FIG. 2, curve A. The overall current efficiency (C.E.) reached a maximum of 45% when the current flowing through the cell was 0.06 amp., and reached a practically constant value of about 30% when the current was raised above 0.1 amp. To pass 0.1 amp. through the cell, an applied potential of 10 volts was required at the generally maintained temperature of 25° C.

When the carbonaceous granules of size 1-2 mm were replaced by coarser grains (2-4 mm), the current efficiency at equal anolyte velocity dropped to the values represented in FIG. 2 by the curve B, showing a maximum of 35% current efficiency at 0.05 amp., and a current efficiency of about 25% at 0.1 amp. or more. A further reduction in current efficiency was observed with even coarser granules, and the use of such granules is not advisable where most economical operation is essential.

The results illustrated in FIG. 2 were confirmed in tests with tap water from the public water supply of the city of Munich, Germany, which was artificially contaminated with organic matter of the type that is readily absorbed on the modified anthracite grains. The tap water employed had a pH of 7.5, contained 315 mg/l non-volatile material, and had a total hardness of 16.8° (German). Each contaminated sample was circulated for 60 minutes through the cell without current flow to determine the reduction in contamination due to adsorption on the granules 18, and a duplicate sample was circulated through the cell while a current of 0.05 amp. flowed between the electrodes 1, 2. Differences between the two samples were considered due to electrolytic oxidation.

From a water sample contaminated with 10 mg/l benzene, 12% of the benzene was removed by electrolysis as determined by IR spectrography of an extract prepared by means of carbon tetrachloride. Urea initially present in an amount of 10 mg/l was reduced by 20% due to electrolytic decomposition, as determined by total organic carbon content in the water sample before treatment, after treatment without current, and after electrolytic treatment. Parathion, originally present in a concentration of 1 mg/l, was reduced by 19%, and an initial lindane concentration of 10 mg/l was reduced by 16%, the parathion and lindane values being determined by gas chromatography.

For comparison purposes, five batches of a solution of 200 mg/l oxalic acid in the same synthetic tap water, adjusted to pH 7.9 for the same conductivity of 480 mhos, were circulated through a modified cell which did not contain adsorbent granules, but in which the spacing between the membrane and the anode was reduced to 1 mm. Although the relatively high concentration of oxalic acid and the narrow anode compartment would be expected to provide higher current efficiency, the amount of oxalic acid destroyed by circulating the test solution through the modified cell corresponded to an overall, average current efficiency of only 0.25% at an applied potential of 11-15 volts which was required to maintain a current of 0.1 amp. between the electrodes.

Carbon is the only conductive material conveniently available at this time that can absorb organic matter from an aqueous liquid, but the various types of conductive carbonaceous material are useful at least to some extent in the method of the invention. The thermally treated anthracite referred to above with reference to FIG. 1 combines desirable properties in the most advantageous manner among all carbonaceous materials that we have been able to test so far. It has the added advantage of being commercially produced ("Hydroanthracite " made by Akdolit, Duesseldorf, Germany). Other suitable materials are activated carbon made by Degussa, Germany, and filtering carbon made by Neptune Microfloc Inc., Oregon, U.S.A.

The materials of the anode and cathode are irrelevant within obvious limits. They must not contribute contaminants of their own to the purified water. The cellulose acetate membrane described with reference to FIG. 1 is merely illustrative of the wide range of dialysis membranes available and fully operative. The nature of the catholyte is not critical, and it may be stationary if the hydrogen gas generated is released or safely contained. Hydrogen bubbles accumulating on the cathode surface may be removed otherwise than by circulating the catholyte, or they may be left in place until they spontaneously detach themselves from the cathode if the resulting increase in necessary cell voltage is not objectionable.

The effects of other variables will be obvious to those skilled in the art, and it should be understood that the invention, within the scope of the appended claims, may be practiced otherwise than as specifically disclosed.

What is claimed is:
1. A method of purifying water contaminated with anodically oxidizable organic matter which comprises:
  a. agitating said contaminated water with particulate, electrically conductive, hydrophilic, carbonaceous material capable of adsorbing said organic matter at a rate sufficient to produce turbulent movement of said material in the mixture so produced; and
  b. contacting said mixture with the electrically conductive surface of a body while a potential applied to said surface and to said water makes the surface anodic relative to said contaminated water,
    1. said rate being sufficient to cause only intermittent contacting between said material and said surface,
    2. said intermittent contacting being continued until a portion of said organic matter adsorbed on the particles of said material is destroyed by passage of current from said particles to said water during said intermittent contacting.

2. A method as set forth in claim 1, wherein the particles of said material have dimensions smaller than 4 millimeters.

3. A method as set forth in claim 2, wherein said dimensions are between 1 and 2 millimeters.

4. A method as set forth in claim 2, wherein said mixture and said body are confined in the anode compartment of an electrolytic cell, said contaminated water being moved continuously through said compartment, said particulate material being retained in said compartment during said moving, and the rate of movement of said water being sufficient to substantially completely prevent agglomeration of said particulate material.

5. A method as set forth in claim 4, wherein said rate of movement is 50 to 55 meters per hour.

6. A method as set forth in claim 1, wherein said potential is sufficient to cause a current flow between $2 \times 10^{-2}$ and $6.6 \times 10^{-2}$ amp. per square decimeter of said surface.

* * * * *